United States Patent [19]

Heinrich et al.

[11] Patent Number: 4,730,513

[45] Date of Patent: Mar. 15, 1988

[54] ELECTROMECHANICAL DEVICE FOR ACTIVATING A ROTATING POST THAT MOVES THE LEAF OF A SWINGING DOOR ON A VEHICLE

[75] Inventors: Siegfried Heinrich, Ebermunde-Besse; Manfred Horn, Kaufungen; Uwe Knothe, Kassel, all of Fed. Rep. of Germany

[73] Assignee: Firma Gebr. Bode & Co GmbH, Kassel, Fed. Rep. of Germany

[21] Appl. No.: 914,106

[22] Filed: Oct. 1, 1986

[30] Foreign Application Priority Data

Oct. 3, 1985 [DE] Fed. Rep. of Germany ....... 3535259

[51] Int. Cl.[4] ........................ E05B 65/10; F16H 57/00

[52] U.S. Cl. ........................................ 74/625; 74/405; 49/141; 192/2; 192/96

[58] Field of Search ........................ 74/625, 99 A, 405; 192/2, 96, 71; 310/92, 93, 78; 464/119, 120; 49/334, 335, 340, 141; 24/453

[56] References Cited

U.S. PATENT DOCUMENTS

| | | | |
|---|---|---|---|
| 1,015,254 | 1/1912 | Whisler | 192/96 |
| 2,611,464 | 9/1952 | Rabe | 192/96 |
| 2,772,578 | 12/1956 | Kling | 74/625 |
| 3,103,830 | 9/1963 | Allaria | 74/625 |
| 3,528,263 | 9/1970 | Stern | 464/119 |
| 3,659,686 | 5/1972 | Markley | 192/2 |
| 4,375,140 | 3/1983 | Blair et al. | 49/141 |
| 4,381,048 | 4/1983 | Haverkamp et al. | 192/2 |
| 4,472,910 | 9/1984 | Iha | 74/625 |

FOREIGN PATENT DOCUMENTS

| | | | |
|---|---|---|---|
| 96158 | 6/1963 | Denmark | 49/334 |
| 853398 | 11/1960 | United Kingdom | 24/453 |

*Primary Examiner*—Lawrence Staab

*Attorney, Agent, or Firm*—Sprung Horn Kramer & Woods

[57] ABSTRACT

An electromechanical device for activating a rotating post that moves the leaf of a swinging door on a vehicle, especially a mass-transit vehicle. An electric motor activates the column by means of an intermediate worm gear. The motor outtake shaft is coupled to the worm-gear intake shaft. A worm wheel is coupled to the worm-gear outtake shaft, which activates the rotating post. The electromechanical activating device contains an emergency mechanism for uncoupling the worm-gear outtake shaft from the worm wheel in relation to their rotation. The mechanism incorporates a coupling that can be disengaged between the outtake shaft and the worm wheel, which is mounted over it coaxially. The mechanism also involves several balls situated such that they can be forced into recesses in the outtake shaft while simultaneously engaging axial grooves in the inner surface of the worm wheel. The end of the outtake shaft that is remote from the rotating post has an axial bore that the recesses lead into and that accommodates a cylindrical slide. The balls rest against the surface of the slide. The slide has an initial longitudinal section with a diameter that ensures that a prescribed volume of each ball will project out of the recesses. The slide also has an adjacent longitudinal section with a diameter that continuously decreases to a length such that the balls will completely enter the recesses. A mechanism displaces the slide to a prescribed extent against the force of a compression spring.

3 Claims, 9 Drawing Figures

FIG. 3
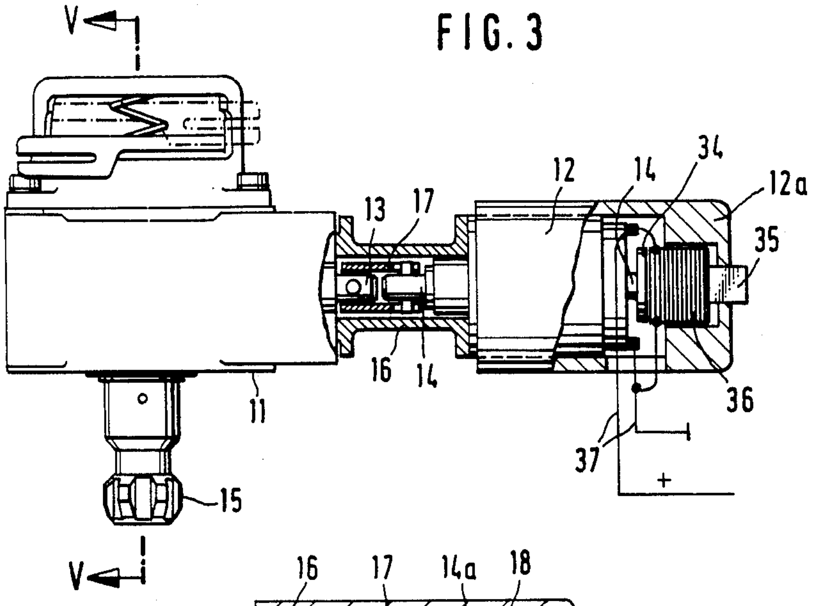
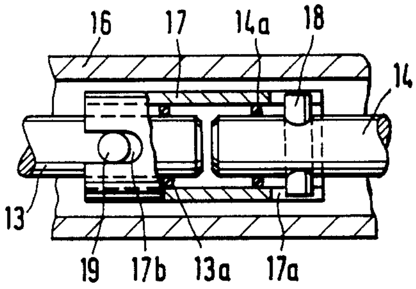
FIG. 4
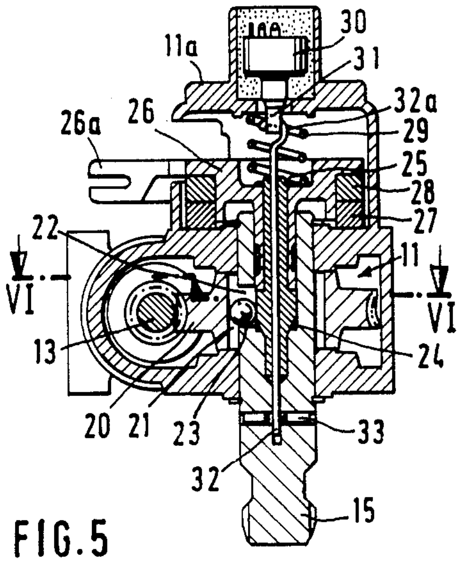
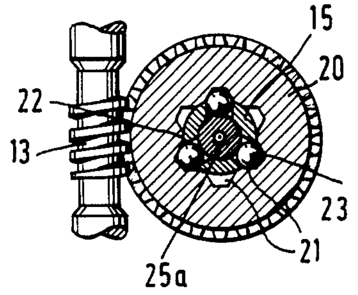
FIG. 6
FIG. 5

ELECTROMECHANICAL DEVICE FOR ACTIVATING A ROTATING POST THAT MOVES THE LEAF OF A SWINGING DOOR ON A VEHICLE

BACKGROUND OF THE INVENTION

The present invention relates to an electromechanical device for activating a rotating post that moves the leaf of a swinging door on a vehicle, especially a mass-transit vehicle, with an electric motor that activates the column by means of an intermediate worm gear, whereby the motor outtake shaft is coupled to the worm-gear intake shaft and a worm wheel is coupled to the worm-gear outtake shaft, which activates the rotating post.

Electromechanical activating devices of this type are preferred for moving the leaves of swinging doors in busses and trolley cars. One problem that occurs is that the activating device, which is usually mounted above the rotating post, cannot occupy much space because of limitations on the overall height of the vehicle. Another problem that occurs especially in relation to electromechanical activating devices with the aforesaid characteristics is that it must be possible to open the door manually in an emergency, meaning that the rigid mechanical coupling between the motor outtake shaft and the worm-gear outtake must be disengaged at some point to facilitate opening the door. The accordingly necessary additional components on the activating device must of course also occupy little space while remaining extraordinarily reliable.

SUMMARY OF THE INVENTION

The object of the present invention is to improve an electromechanical activating device of the aforesaid type to the extent that, while being inexpensive to manufacture out of components that are as reliable and long-lasting as possible and occupying little space, it can be uncoupled from the leaf in an emergency to facilitate opening the door manually.

The object of the present invention is also intended to make it possible to communicate the rotation of the post in a simple way to an electric signal generator in order to indicate the motions of the leaf as it opens and closes. Signal generators of this type are known for controlling accessory anticatching devices that arrest or reverse the motion of the door when a malfunction occurs in the motion of the door, due to something being caught between the leaves for example.

Finally, the object of the invention is intended to make it possible, when a worm gear that is not sufficiently self-inhibiting is employed, to provide components that will prevent the door from opening unintentionally while occupying as little space and being as simple in design as possible.

This object is attained in accordance with the invention by means of an improvement wherein, first, the electromechanical activating device contains an emergency mechanism for uncoupling the worm-gear outtake shaft from the worm wheel in relation to their rotation, incorporating a coupling that can be disengaged between the outtake shaft and the worm wheel, which is mounted over it coaxially, and that involves several balls situated such that they can be forced into recesses in the outtake shaft while simultaneously engaging axial grooves in the inner surface of the worm wheel, whereby the end of the outtake shaft that is remote from the rotating post has an axial bore that the recesses lead into and that accommodates a cylindrical slide, the surface of which the balls rest against, which has an initial longitudinal section with a diameter that ensures that a prescribed volume of each ball will project out of the recesses, and which has an adjacent longitudinal section with a diameter that continuously decreases to a length such that the balls will completely enter the recesses and wherein, second, a mechanism displaces the slide to a prescribed extent against the force of a compression spring.

To allow the balls to roll when the coupling is engaged and disengaged, it turns out to be especially practical for the recesses in the worm-gear outtake shaft to be longer axially than the diameter of the balls.

The inside diameter of the axial bore in the worm-gear outtake shaft in one especially preferred embodiment of the invention is longer at all points than the outside diameter of the cylindrical slide at the same points, and the slide is freely suspended on a ball-and-socket joint on the mechanism that pushes the slide. The slide can accordingly be adjusted so that all three balls will always be uniformly loaded, preventing the balls from fracturing and the edges of the recesses from breaking as the result of unilateral load.

The mechanism that pushes the slide can have two parallel annular plates that extend perpendicular to the axis of the slide, that can rotate independently, and that have adjacent sloping surfaces, one plate being axially and frictionally secured to the slide and the other rigidly fastened to the housing of the worm gear.

The slide can be non-rotatably secured to the worm-gear outtake shaft.

The aforesaid electric signal generator can be mounted upstream of the end of the worm-gear outtake shaft that is remote from the rotating post with the generator intake shaft connected to the worm-gear outtake shaft by means of a rod that extends through an axial bore in the slide.

The worm-gear intake shaft can be connected by means of a sleeve coupling to the motor outtake shaft or to the outtake shaft of a sun-and-planet gear between the motor and the worm gear, with the sleeve in the coupling having an axial slot at each end that is engaged by a radial connecting pin on the shafts that are being coupled.

The motor outtake shaft can have an electrically activated brake comprising a disk of ferromagnetic material mounted on the end of the motor outtake shaft remote from the worm gear and separated by a prescribed extent from and facing a permanent magnet that can be displaced axially but is connected non-rotatably to the motor housing, whereby the force of the magnet can be cancelled out by activating a coil by means of a current that begins to flow when the motor is turned on.

The activating device in accordance with the invention provides a very simple means of uncoupling the worm-gear takeoff shaft from the worm gear, by means of an emergency lever for example, subsequent to which the leaf of the swinging door can be opened very easily by hand without entraining the components of the device.

As will be specified later herein with reference to one embodiment, the device in accordance with the invention can be connected in a very simple way to an electric signal generator and, by means of a very simple design, to a mechanism for generating an additional braking moment when the leaf of the door is closed.

A preferred embodiment of the invention will now be described with reference to the attached drawings, wherein

BRIEF DESCRIPTION OF THE DRAWINGS

FIG. 3 is a larger-scale partly sectional detail of the connection between the electric motor and the worm gear of the device illustrated in FIG. 1, FIG. 4 is an even larger-scale view of the sleeve connection between the electric motor and the worm gear of the device illustrated in FIG. 1, FIG. 5 is a vertical section through the worm gear in the coupled state along the line V—V in FIG. 3, FIG. 6 is a partial section along the line VI—VI in FIG. 5.

DETAILED DESCRIPTION OF THE PREFERRED EMBODIMENTS

Figure 1:
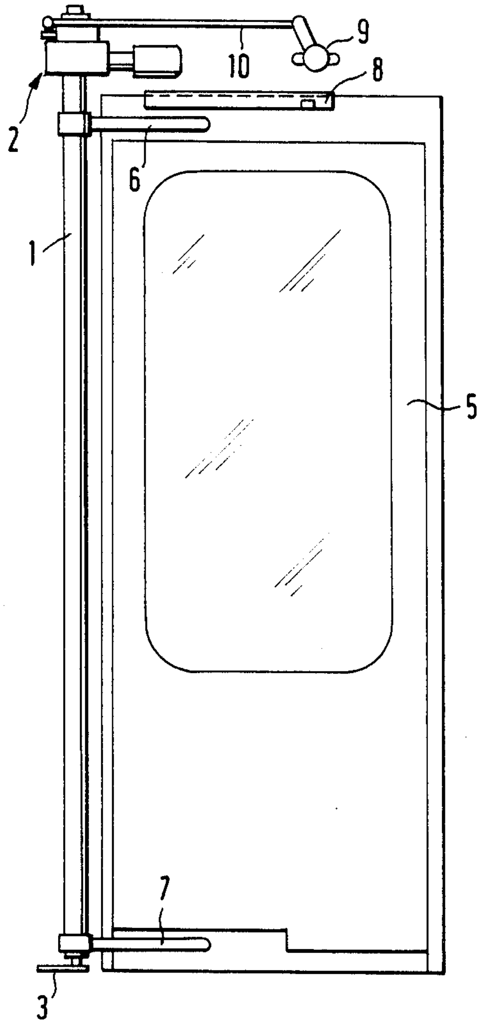
FIG. 1 is a front view of the leaf of a swinging door, the leaf being connected by means of pivoting arms to an electromechanical activating device
Figure 2:
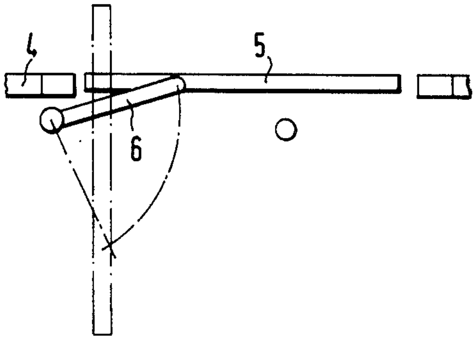
FIG. 2 is a top view of the leaf illustrated in FIG. 1.

With reference to FIGS. 1 and 2, a rotating post 1 for the leaf 5 of a swinging door is mounted on pivoting arms 6 and 7 in an otherwise unillustrated bus. Rotating post 1 is secured to the body 4 of the bus by a mount 3 at the bottom and by an electromechanical activating device 2 at the top. Leaf 5 is also positioned in a known way in relation to the doorframe or body by a schematically illustrated guide 8.

Leaf 5 is represented in FIG. 2 by continuous lines in the closed position and by dot-and-dash line in the open position.

The leaf opens to an angle of approximately 90°.

Rotating post 1 can be rotated around its longitudinal axis by electromechanical activating device 2. The rotation is communicated to leaf 5 through pivoting arms 6 and 7 to open and close the door.

As shown in FIG. 3, the upper end of rotating post 1 is for this purpose connected to the outtake shaft 15 of a worm gear 11. Worm gear 11 is connected to an electric motor 12 by a connector 16. The intake shaft 13 of worm gear 11 is connected to the outtake shaft 14 of electric motor 12 by a sleeve coupling that compensates for axial tolerance and for linear displacement. An unillustrated sun-and-planet gear can of course also be positioned between electric motor 12 and worm gear 11. In that case, the sleeve coupling would be between worm-gear intake shaft 13 and the outtake shaft of the sun-and-planet gear. The sleeve 17 that surrounds the sleeve coupling between the adjacent ends of worm-gear intake shaft 13 and of motor outtake shaft 14 has axial slots 17*a* and 17*b* at its ends as shown in FIG. 4. The slots are engaged by radial connecting pins 18 and 19. The result is a rotatably fixed coupling between shafts 14 and 13 that compensates for axial tolerances and linear displacements.

Between the end of worm-gear intake shaft 13 and slot 17*b* and between the end of motor outtake shaft 14 and slot 17*a* an 0-ring 13*a* and 14*a* is mounted on each shaft. The 0-rings provide an elastic and noise-attenuating seat for sleeve 17 on shafts 13 and 14.

Subject to normal operation by device 2, it should be impossible to open leaf 5 intentionally or unintentionally by hand. It should also be impossible for the leaf to open automatically due to vibration or impact. When a worm gear 11 that is sufficiently self-inhibiting is employed, one with a constant transmission ratio of 1:60 for example, further preventive measures will be unnecessary. If, however, the gear has a slightly lower ratio, 1:40 or less for example, self-inhibition may not be sufficient to ensure an adequate braking action against unintented opening when the door is closed outside of an emergency situation.

The additional mechanism illustrated in FIG. 3 is intended for this case. It generates a sufficient supplementary braking action in an extraordinarily simple way.

The braking mechanism is mounted at electric motor 12, specifically on the rear end of motor outtake shaft 14. The mechanism comprises both a disk 34 of ferromagnetic material secured to the end of motor outtake shaft 14 that is remote from rotating post 1 and, facing the disk from a prescribed short distance away, an axially displaceable permanent magnet 35 secured in a non-rotating manner to the housing 12*a* of the motor. Magnet 35 is surrounded by a coil 36 supplied with an activating current through the line 37 that leads to electric motor 12. When the motor is off, ferromagnetic disk 34 and the axially displaceable permanent magnet 35 are mutually attracted and the magnet comes into contact with and adheres to the disk. The result is a braking action on motor outtake shaft 14 due to the non-rotating connection between the magnet and motor housing 12*a*. This relatively low braking moment is magnified by the worm-gear transmission ratio and if necessary by that of the intermediate sun-and-planet gear, producing a very powerful braking moment on worm-gear outtake shaft 15 and preventing leaf 5 from opening automatically even when the worm gear is very weakly self-inhibiting.

If leaf 5 is to be opened, electric motor 12 switches on and an activating current is supplied to coil 36 along with the motor current, cancelling out the magnetic force due to the oppositely charged field generated by the coil. Thus, when the device is in operation, the additional braking moment will be absent and the device can function unimpeded.

The worm gear 11 between electric motor 12 and outtake shaft 15 will now be specified with reference to FIGS. 5 through 8.

A worm wheel 20 mounted coaxially on worm-gear outtake shaft 15 engages the intake shaft 13 inside the housing of worm gear 11. An emergency uncoupler in the form of a disengaging coupling between outtake shaft 15 and worm wheel 20 is provided for purposes of rotational uncoupling of outtake shaft 15 and worm wheel 20. Several balls 23 are positioned in recesses 22 in worm-gear outtake shaft 15. The balls can either project part-way out of the recesses or rest completely inside them. When the balls extend part-way out of the recesses, they engage axial grooves 21 in the inner surface of worm wheel 20. FIGS. 5 and 6 illustrate the coupling in this engaged state.

Figure 7:
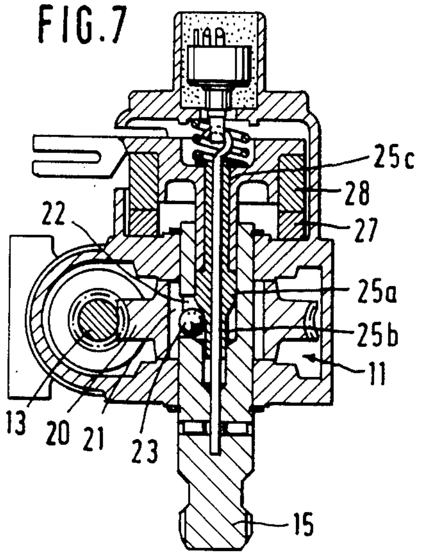
FIG. 7 is a vertical section showing the worm gear of FIG. 5 in the uncoupled state.
Figure 8:
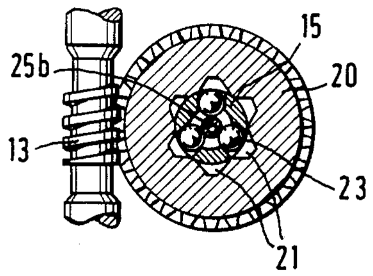
FIG. 8 is a partial section showing the worm gear of FIG. 6 in the uncoupled state.

The coupling is disengaged when balls 23 descend into recesses 22. The end of worm-gear outtake shaft 15 that is at the top in FIG. 1 and remote from rotating post 1 has an axial bore 24 that extends down beyond recesses 22, with the recesses opening into it. A cylindrical slide 25 slides up and down in bore 24. Slide 25 is secured in a non-rotating manner to outtake shaft 15 by the pressure of balls 23 and accordingly rotates with it. In the vicinity of recesses 22, cylindrical slide 25 consists of two adjacent longitudinal sections 25*a* and 25*b*. The diameter of initial longitudinal section 25*a* is large enough to allow a prescribed volume, equaling about half said diameter, of each ball 23 to extend out of recesses 22 (FIG. 5) when the balls rest against the slide at that point. Adjacent to and below longitudinal section 25*a*, the diameter of longitudinal section 25*b* continuously decreases to a length at which balls 23 will descend completely into recesses 22 when they rest against cylindrical slide 25 at that point. This state is illustrated in FIGS. 7 and 8. The coupling is disengaged and worm-gear outtake shaft 15 can rotate freely in relation to worm wheel 20.

The mechanism that pushes cylindrical slide 25 incorporates two parallel annular plates 27 and 28 extending perpendicular to the axis of the slide and positioned above worm-gear intake shaft 13. The plates rest against each other and their facing sides have sloping helical surfaces. Lower annular plate 27 is rigidly mounted on the housing of worm gear 11 and upper annular plate 28 is attached to a guide 26 that rotates and slides axially between the upper end 25*c* of cylindrical slide 25 and outtake shaft 15 in axial bore 24. Thus, annular plates 27 and 28 rotate in relation to each other with, as will be evident from FIGS. 5 and 7, upper plate 28 ascending and descending. Guide 26 is axially secured by friction to slide 25, which accordingly ascends and descends as annular plates 27 and 28 rotate. FIG. 5 illustrates the lower and FIG. 7 the upper position. When slide 25 is in the lower position, the coupling is activated due to the intervention of balls 23. When slide 25 is in the upper position, balls 23 are completely inside recesses 22 and the coupling is disengaged.

To allow the balls to roll while the coupling is being engaged and disengaged, recesses 22 are axially longer than the diameter of the balls. Ensuring that the balls can roll considerably reduces wear on the device and make the coupling easier to disengage.

Guide 26 has a lever arm 26*a* that is engaged by an emergency lever 9 through the rod 10 illustrated in FIG. 1, rotating the guide.

Guide 26 is lifted against the force of a compression spring 29 accommodated inside the housing of worm gear 11 between its lid 11*a* and the upper surface of the guide.

Also mounted on the lid 11*a* of the housing for worm gear 11 is an electric signal generator, a rotary potentiometer 30 for example. The generator releases signals representing the position of leaf 5 to unillustrated controls, an anticatch mechanism for example.

The rotations of worm-gear outtake shaft 15 are picked up and transmitted to the intake shaft 31 of rotary potentiometer 30 by means of a slender transmission rod 32. The upper end of the rod is connected to potentiometer intake shaft 31 by means of a hook 32*a*. Rod 32 extends through an axial bore 25*e* in cylindrical slide 25 into another axial bore 15*a* in worm-gear outtake shaft 15 and secured by radial screws 33. The rotations of worm-gear outtake shaft 15 and hence of rotating post 1 are accordingly transmitted to the intake shaft 31 of rotary potentiometer 30.

Figure 9:
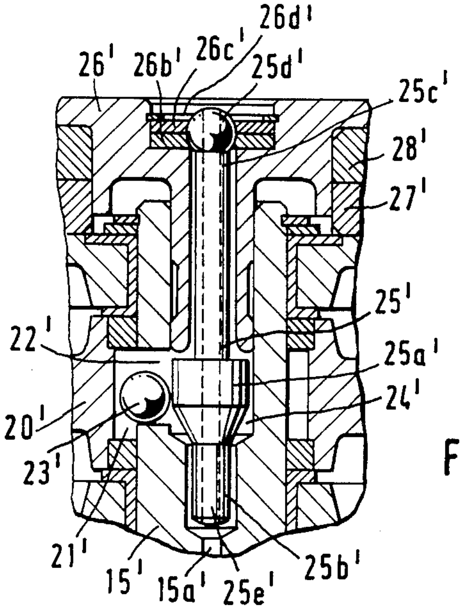
FIG. 9 is a larger-scale partial section similar to FIG. 5 showing a variant of the embodiment illustrated in FIGS. 5 through 8.

A variant of the embodiment of an electromechanical activating device just specified herein will now be specified with reference to FIG. 9. The variant is identical in many details with the embodiment specified with reference to FIGS. 5 through 8. The only differences are in the vicinity of the slide inside the worm-gear outtake shaft.

The same references numbers are employed with the addition of an apostrophe in FIG. 9 for parts that are identical to those described with reference to FIGS. 5 through 8.

Between a worm-gear outtake shaft 15′ and a worm wheel 20′, is a coupling of the type previously specified herein. Several (three in the present case) balls are positioned in recesses 22′ in outtake shaft 15′ and engage axial grooves 21′ in worm wheel 20′ when they extend out of the recesses.

Inside the axial bore 24′ that recesses 22′ open into in worm-gear outtake shaft 15′ is a cylindrical slide 25′. Slide 25′ also consists of two adjacent longitudinal sections 25*a*′ and 25*b*′. The diameter of initial longitudinal section 25*a*′ is long enough to allow a prescribed volume of each ball 23′ to extend out of recesses 22′ when the balls rest against the slide at that point. Adjacent to and below longitudinal section 25*a*′, the diameter of longitudinal section 25*b*′ continuously decreases to a length at which balls 23′ will descend completely into recesses 22′ when they rest against cylindrical slide 25′ at that point.

In contrast to the original embodiment, however, the upper end 25*c*′ of cylindrical slide 25′ is suspended from a ball-and-socket joint on guide 26′, allowing the slide 25′ to slide axially. In a recess on the top of guide 26′ are two bearings in the form of retaining plates 26*b*′ and 16*c*′ that surround the ball 25*d*′ of the ball-and-socket joint. Ball 25*d*′ is connected to the upper end 25*c*′ of the slide. Retaining plates 26*b*′ and 26*c*′ are secured with a retaining ring 26*d*′. Guide 26′ is moved similarly to the previously specified guide by annular plates 27′ and 28′. Guide 26′ is lifted against the force of an unillustrated spring like the compression spring 29 illustrated in FIG. 5.

Suspending cylindrical slide 25′ on ball 25*d*′ allows the slide to swing freely. To allow the slide to actually adjust itself freely within certain limits, the bore 24′ in worm-gear outtake shaft 15′ and the bore in the section of guide 26′ that extends into shaft 15′ have an inside diameter that is longer at all points along the slide than the outside diameter of the slide. The result is an empty space between cylindrical slide 25′ and outtake shaft 15′ or guide 26′ that allows the slide to swing. This ensures that, when the coupling is disengaged, the slide will freely adjust itself so that all three balls 23′ and the edges of recesses 22′ adjacent to them will be uniformly loaded. Thus, manufacturing tolerances for example will not result in extremely high stress on any one of the three balls, leading to premature wear or to breakage of the balls or of the edges of the recesses.

It is also possible to provide a coaxial bore 25*e*′ in the cylindrical slide 25′ in this embodiment in order to provide access as in the embodiment specified with reference to the FIGS. 5 through 8 for a rod secured in a coaxial bore 15*a*′ in shaft 15′ to an unillustrated rotary potentiometer.

It will be appreciated that the instant specification and claims are set forth by way of illustration and not limitation, and that various modifications and changes may be made without departing from the spirit and scope of the present invention.

What is claimed is:

1. In an electromechanical device for activating a rotating post that moves a leaf of a swinging door on a vehicle, having an electric motor with an outtake shaft that activates the post by an intermediate worm gear with an intake shaft, an outtake shaft and a worm wheel, means coupling the motor outtake shaft to the worm-gear intake shaft and means coupling the worm wheel to the worm-wheel outtake shaft which activates the rotating post, the improvement comprising: emergency means for uncoupling the worm-wheel outtake shaft from the worm wheel in relation to their rotation, comprising the worm wheel mounted completely over the outtake shaft and a coupling that can be disengaged between the outtake shaft and the worm wheel, including recesses in the outtake shaft and axial grooves in an inner surface of the worm wheel and balls forcable into the recesses in the outtake shaft while simultaneously engaging the axial grooves in the inner surface of the worm wheel, wherein the recesses in the worm-wheel outtake shaft are longer axially than the diameter of the balls, wherein one end of the outtake shaft that is remote from the rotating post has an axial bore that the recesses lead into and that accommodates a cylindrical slide having a surface against which the balls rest and an initial longitudinal section with a diameter that ensures that a prescribed volume of each ball will project out of the recesses, and which has an adjacent longitudinal section with a diameter that continuously decreases to such a length that the balls will completely enter the recesses; and means for displacing the slide to a prescribed extent against the force of a compression spring, wherein the inside diameter of the axial bore in the worm-wheel outtake shaft is longer at all points than the outside diameter of the cylindrical slide at the same points, means freely suspending the slide comprising a ball-and-socket joint on the means for displacing the slide, wherein the worm gear has a housing and the means for displacing the slide has two parallel annular plates that extend perpendicular to the axis of the slide and can rotate independently, and that have adjacent sloping surface, one plate being axially and frictionally secured to the slide and the other rigidly fastened to the housing of the worm gear.

2. The electromechanical activating device as in claim 1, further comprising an electric signal generator mounted upstream of the end of the worm-wheel outtake shaft that is remote from the rotating post with a generator intake shaft connected to the worm-wheel outtake shaft via a rod that extends through an axial bore in the slide.

3. The electromechanical activating device as in claim 1, wherein the motor has a housing and further comprising an electrically activated brake comprising a disk of ferromagnetic material mounted on the end of the motor outtake shaft remote from the worm gear and separated to a prescribed extent from and facing a permanent magnet axially displaceable and non-rotatably connected to the motor housing, and a coil for cancelling out the force of the magnet when current begins to flow when the motor is turned on.

* * * * *